United States Patent [19]

Elliott-Moore

[11] Patent Number: 5,735,552
[45] Date of Patent: Apr. 7, 1998

[54] SWIVEL COUPLER

[75] Inventor: Peter Elliott-Moore, Stoke-on-Trent, England

[73] Assignee: Longwall Roof Supports Limited, Wigan, United Kingdom

[21] Appl. No.: 538,450

[22] Filed: Oct. 3, 1995

[30] Foreign Application Priority Data

Nov. 2, 1994 [GB] United Kingdom ............... 9422040
Jul. 26, 1995 [GB] United Kingdom ............... 9515355

[51] Int. Cl.$^6$ .................................. F16L 27/08; F16L 35/00
[52] U.S. Cl. .......................... 285/81; 285/276; 285/305
[58] Field of Search ............................. 285/276, 277, 285/81, 305, 86

[56] References Cited

U.S. PATENT DOCUMENTS

| | | | |
|---|---|---|---|
| 1,371,882 | 3/1921 | Ferguson et al. | 285/277 |
| 2,021,241 | 11/1935 | Mall | 285/276 |
| 2,253,018 | 8/1941 | Cowles | 285/276 |
| 2,736,578 | 2/1956 | Rafferty | 285/277 X |
| 3,142,498 | 7/1964 | Press | 285/276 X |
| 3,334,860 | 8/1967 | Bolton et al. | 285/277 X |
| 3,363,919 | 1/1968 | Brazell, II | 285/276 |
| 4,749,192 | 6/1988 | Howeth | 285/276 X |
| 4,872,710 | 10/1989 | Konecny | 285/81 |
| 5,110,157 | 5/1992 | Chen | 285/277 X |

FOREIGN PATENT DOCUMENTS 651006  3/1951  United Kingdom .
1058685  2/1967  United Kingdom .

*Primary Examiner*—Terry Lee Melius
*Assistant Examiner*—Heather Shackelford
*Attorney, Agent, or Firm*—Young & Thompson

[57]  ABSTRACT

A swivel coupler for releasably and fluid tightly connecting two parts together so that fluid can pass between the two parts and the two parts can rotate relative to one another, comprises a body having an outer surface which, at least in part, is right cylindrical and a collar mounted on the right cylindrical outer body surface for rotation relative thereto. The collar projects beyond one end of the body for connection to one of the two parts and the body is connectable to the other of the two parts. Rotary sealing elements are provided between the collar and the right cylindrical outer body surface. There is a first ball or roller bearing race in the right cylindrical outer body surface and at least one radially extending bearing assembly aperture in the collar for inserting ball or roller bearings into said race when the race and aperture are radially aligned. The collar is displaceable axially relative to the body to bring the ball or roller bearings into contact with a second ball or roller bearing race on the collar after the ball or roller bearings have been inserted into the first race and structure is provided for preventing the collar from returning to a position in which the aperture and first race are radially aligned.

5 Claims, 3 Drawing Sheets

5,735,552

SWIVEL COUPLER

This invention relates to a swivel coupler for releasably and fluid tightly connecting two parts together so that fluid can pass between the parts and the parts can rotate relative to one another even when pressurised with fluid.

SUMMARY OF THE INVENTION

According to the present invention, there is provided a swivel coupler for releasably and fluid tightly connecting two parts together so that fluid can pass between the two parts and the two parts can rotate relative to one another, comprising a body having an outer surface which, at least in part, is right cylindrical and a collar mounted on the right cylindrical outer body surface for rotation relative thereto, the collar being connectible to one of the two parts and the body being connectible to the other of the two parts, rotary sealing means between the collar and the right cylindrical outer body surface, a first ball or roller bearing race in the right cylindrical outer body surface, at least one radially extending bearing assembly aperture in the collar for inserting ball or roller bearings into said race when the race and aperture are radially aligned, the collar being displaceable axially relative to the body to bring the ball or roller bearings into contact with a second ball or roller bearing race on the collar after the ball or roller bearings have been inserted into the first race, and means for preventing the collar from returning to a position in which the aperture and first race are radially aligned.

Thus, as the collar is rotatable relative to the body, and one of the two parts is connectible to the collar and the other of the two parts is connectible to the body, the two parts are rotatable relative to one another.

Preferably, the collar projects beyond one end of the body for connection to said one part.

Preferably, the preventing means comprises a first part for insertion between an end of the collar and a radially outwardly extending shoulder on the body to prevent return axial displacement of the collar relative to the body and a second part which extends along part of the outer surface of the collar to cover the bearing assembly aperture(s). The second part of the preventing means can thus seal the races from the environment. The first and second parts may be integral with one another or may be separate parts. If separate parts, the second part may hold the first part in place.

Additionally or alternatively, the bearing assembly aperture(s) is/are plugged with sealing material or a sealing member or members.

Preferably, said one part is releasably connectible to the collar by a U-shaped connecting member having two arms which enter a pair of parallel tangential holes in the collar to, in use, engage a groove in said one part.

The invention will now be more particularly described, by way of example, with reference to the accompanying drawings.

DESCRIPTION OF THE PREFERRED EMBODIMENTS

Figure 1:
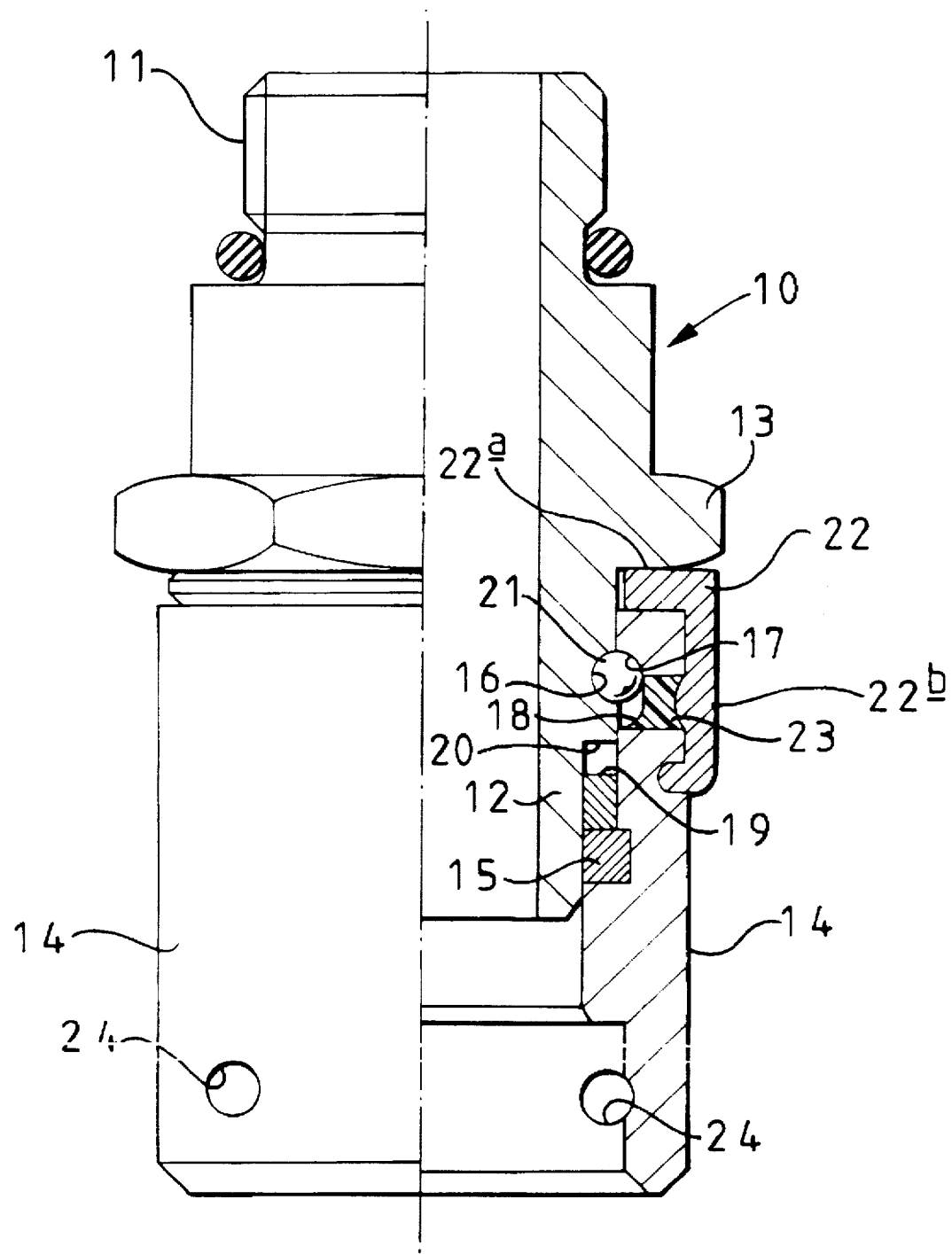
FIG. 1 is a side view, partly in section, showing one embodiment of a swivel coupler according to the present invention.

Referring to the drawing, the swivel coupler shown therein comprises a body 10 having a first end portion 11 which can be sealingly engaged in a port in an hydraulic device, such as a mine roof support, a second end portion 12 and an hexagonal nut portion 13 between the first and second end portions. The two end portions 11 and 12 have right cylindrical outer surfaces of stepped diameter.

A collar 14 is mounted for rotation on the right cylindrical outer surface of the second end portion 12 and projects beyond the second end portion 12 of the body 10 to sealingly receive a fitting (not shown) which is typically provided on the end of an hydraulic hose (also not shown). The collar 14 has a stepped internal diameter. A rotary seal 15, typically a hallite seal, is supported in a groove in the collar 14.

The second end portion 12 of the body 10 has a ball race 16 defined by an annular groove of substantially semi-circular section in its outer surface. The collar 14 also has a ball race 17 defined by one end of an annular groove in its inner surface. The collar 14 also has at least one, and typically two, bearing assembly apertures 18 which extend radially through the collar and communicate with the other end of the groove in the inner surface of the collar. The bearing assembly apertures 18 are radially aligned with the ball race 16 when either one end of the collar 14 abuts the nut portion 13 or a step 19 on the inner surface of the collar 14 abuts a step 20 on the outer surface of the second end portion 12 of the body 10. With the collar 14 in this position, ball bearings 21 can be inserted through the aperture(s) 18 and into the ball race 16 in the body 10. The collar 14 can then be displaced axially relative to the body 10 to bring the ball bearings 21 into contact with the race 17 in the collar 14, as shown in the drawing.

The collar 14 is retained in this position by a ball race pre-loader 22, typically in the form of an elastomeric element which is stretched over the collar into position. The pre-loader 22 has an annular portion 22a which fits between the hexagonal nut portion 13 of the body 10 and an adjacent end of the collar 14, and a skirt portion 22b which extends along part of the outer surface of the collar 14 to cover the bearing assembly aperture(s) 18. The skirt portion 22b will then seal the races 16 and 17 from the environment.

Additionally or alternatively, to the skirt portion 22b, the bearing assembly aperture(s) 18 may be plugged with sealing material or with a sealing member 23.

The ball bearings 21 hold the body 10 and collar 14 together and take the load applied to the collar 14 by pressure and the motion of the connected hose.

The aforesaid fitting which is received in the free end of the collar 14 may be releasably connected to the collar by a U-shaped connecting member (not shown) having two arms which enter a pair of parallel tangential holes 24 in the collar 14 to engage an annular groove in the fitting. This is commonly referred to in the art as a staple lock connection.

By virtue of the collar 14 being rotatable relative to the body 10, the fitting will be rotatable relative to the hydraulic device in response to an applied twisting load.

Figure 2:
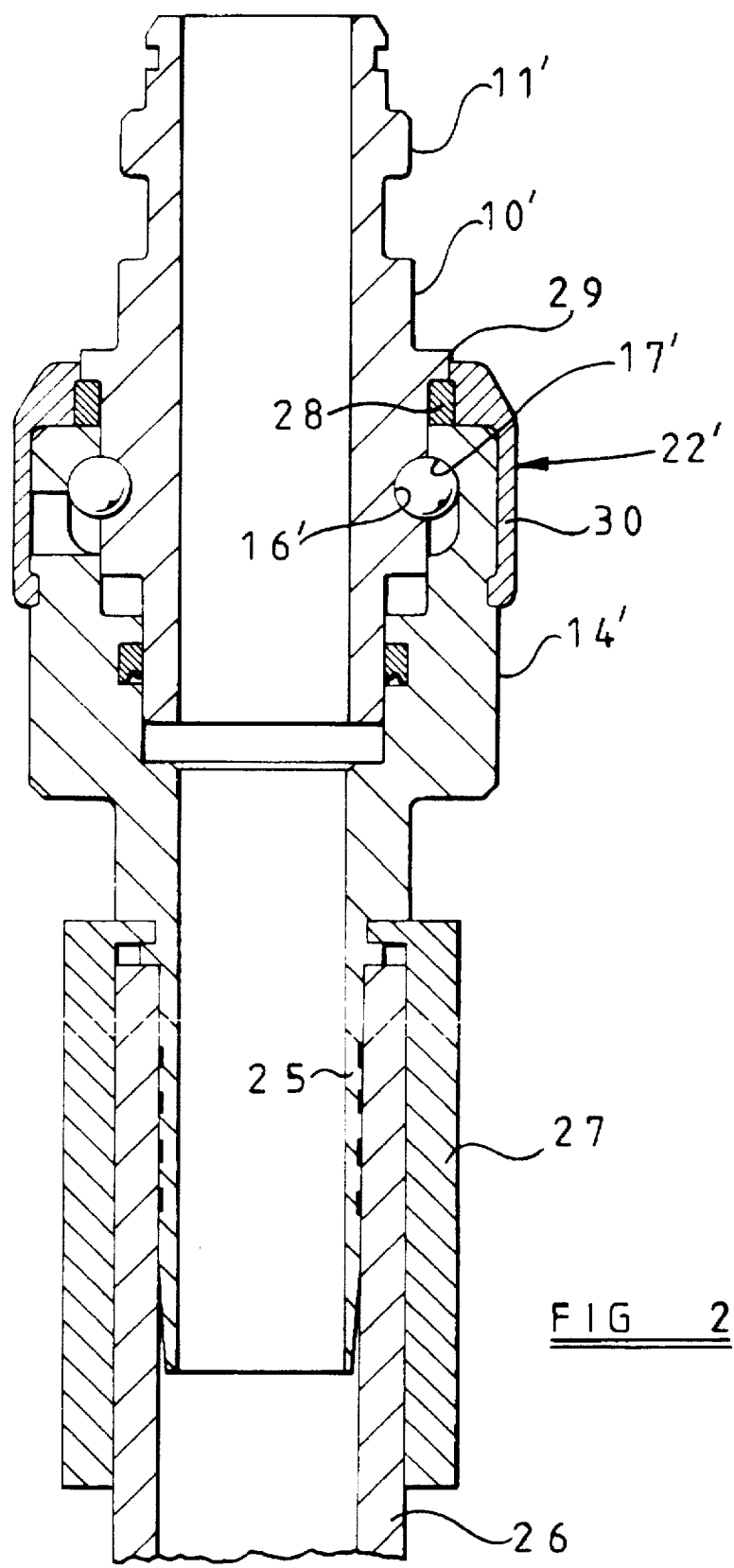
FIG. 2 is a sectional view of a second embodiment of a swivel coupler according to the present invention.

The embodiment shown in FIG. 2 differs from that shown in FIG. 1 chiefly in that the collar 14' has an integral tubular hose receiving part 25 for receiving a hose 26 which is clamped on the part 25 by crimped ferrule 27. Also, the ball race pre-loader 22' is in two parts. The first part is in the form of a brass ring 28 formed in two halves which are fitted between an annular flange 29 (which replaces the hexagonal nut portion 13) of the body 10' and an adjacent end of the collar 14', and the second part is in the form of an elastomeric retaining shroud 30 which fits over the ring 28 and collar 14' to hold the two halves of the ring 28 together and seal the bearing races 16' and 17' from the environment. Also, the first end portion 11' of the body 10' is in the form of a male part of a staple lock connection.

Figure 3:
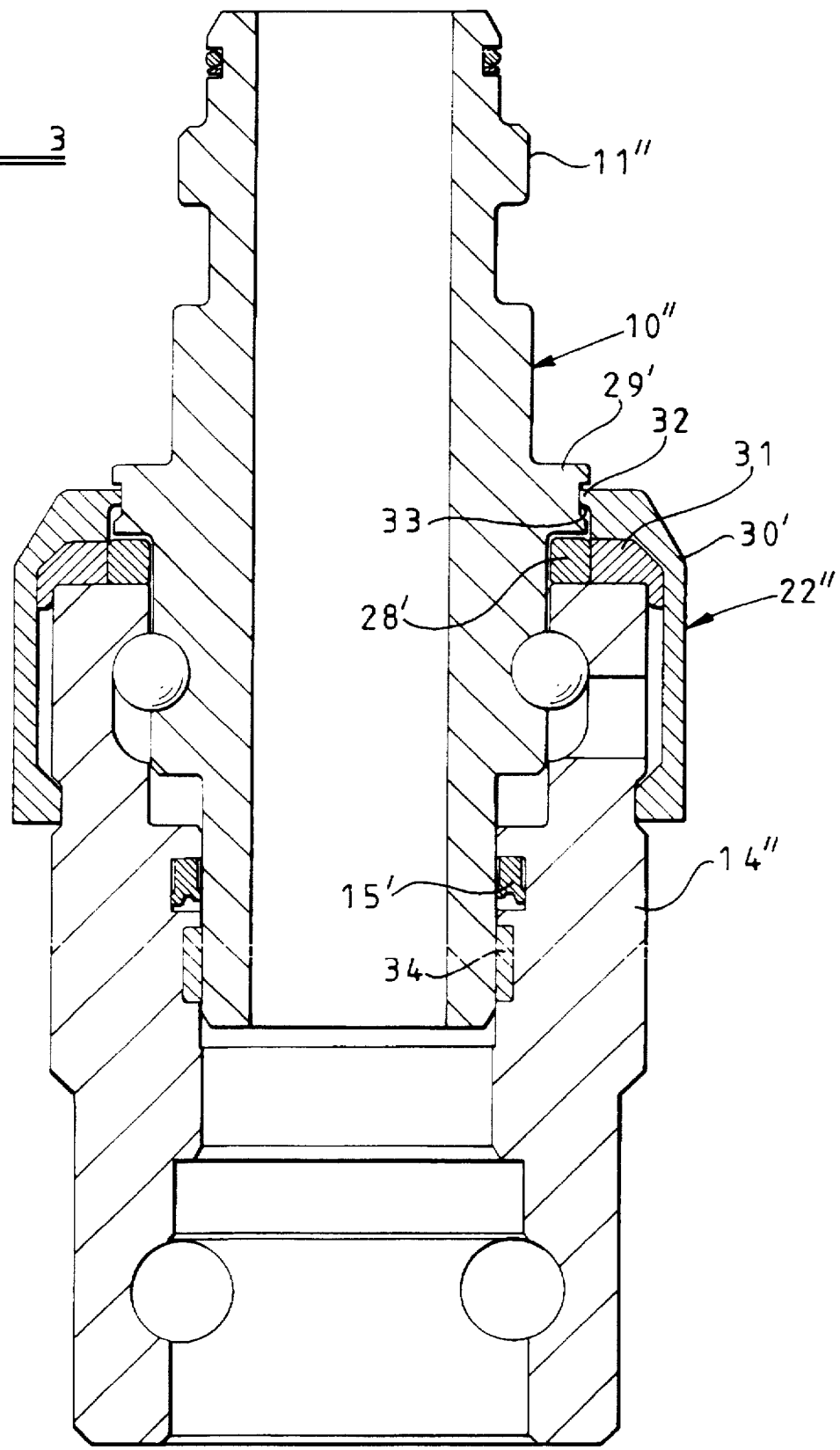
FIG. 3 is a sectional view of a third embodiment of a swivel coupler according to the present invention.

The embodiment shown in FIG. 3 differs from that shown in FIG. 1 chiefly in that the ball race pre-loader 22" is similar to that shown in FIG. 2 and comprises a brass ring 28' formed in two halves and an elastomeric retaining shroud 30'. In this case, however, the elastomeric retaining shroud 30' is moulded to a brass ring 31 which fits over the two halves of the ring 28' and has a lip 32 which sits in an annular groove 33 in the flange 29' to form a grease seal. Also, the collar 14" has a rotary hythane lip seal 15' and a thin woven fabric reinforced polyester/PTFE wear ring 34. The first end portion 11" of the body 10" is again in the form of a male part of a staple lock connection.

The above embodiment is given by way of example and various modifications will be apparent to persons skilled in the art without departing from the scope of the invention. For example, the bearings 21 may be roller bearings and the races 16 and 17 may be appropriately shaped.

What is claimed is:

1. A swivel coupler for releasably and fluid-tightly connecting first and second parts together so that fluid can pass between the first and second parts and so that the first and second parts can rotate relative to one another, said swivel coupler comprising:

a body having an outer body surface, which, at least in part, is right cylindrical;

a collar rotatably mounted on the right cylindrical outer body surface, the collar being connectable to the first part and the body being connectable to the second part;

rotary sealing means between the collar and the right cylindrical outer body surface;

a first bearing race in the right cylindrical outer body surface, said first bearing race being one of a ball and roller type;

at least one radially extending bearing assembly aperture in the collar for inserting one of ball and roller bearings into said first bearing race when the first bearing race and the at least one bearing assembly aperture are radially aligned, said at least one bearing assembly aperture extending through said collar, the collar being displaceable axially relative to the body to bring the one of the ball and roller bearings into contact with a second bearing race on the collar after the one of the ball and the roller bearings have been inserted into the first bearing race, said second bearing race being of one of a ball and roller type; and preventing means for preventing the collar from returning to a position in which the at least one bearing assembly aperture and said first bearing race are radially aligned, said preventing means comprising an annular portion for insertion between an end of the collar and a radially outwardly extending shoulder on the body to prevent a return axial displacement of the collar relative to the body, and a skirt portion, which extends along part of an outer surface of the collar to cover the at least one bearing assembly aperture.

2. A swivel coupler as claimed in claim 1, wherein the annular and skirt portions are integral with one another.

3. A swivel coupler as claimed in claim 1, wherein the annular and skirt portions are separate, the skirt portion holding the annular portion in place.

4. A swivel coupler as claimed in claim 1, wherein the at least one bearing assembly aperture is plugged with sealing means.

5. A swivel coupler for releasably and fluid-tightly connecting first and second parts together so that fluid can pass between the first and second parts and so that the first and second parts can rotate relative to one another, said swivel coupler comprising:

a body having an outer body surface, which, at least in part, is right cylindrical;

a collar mounted on the right cylindrical outer body surface for rotation relative thereto, the collar being connectable to the first part and the body being connectable to the second part;

rotary sealing means between the collar and the right cylindrical outer body surface;

a first bearing race in the right cylindrical outer body surface, said first bearing race being one of a ball and roller type;

at least one radially extending bearing assembly aperture in the collar for inserting one of ball and roller bearings into said first bearing race when the first bearing race and the at least one bearing assembly aperture are radially aligned, said at least one bearing assembly aperture extending through said collar, the collar being displaceable axially relative to the body to bring the one of the ball and roller bearings into contact with a second bearing race on the collar after the one of the ball and the roller bearings have been inserted into the first bearing race, said second bearing race being of one of a ball and roller type; and means for preventing the collar from returning to a position in which the at least one bearing assembly aperture and said first bearing race are radially aligned;

wherein the at least one bearing assembly aperture is plugged with sealing means.

* * * * *

UNITED STATES PATENT AND TRADEMARK OFFICE
CERTIFICATE OF CORRECTION

PATENT NO. : 5,735,552
DATED : April 7, 1998
INVENTOR(S) : Peter ELLIOTT-MOORE

It is certified that error appears in the above-indentified patent and that said Letters Patent is hereby corrected as shown below:

Item [30]
In the listing of "Foreign Patent Documents" on the cover sheet, add the following:

```
--47342/64      1/67       Australia
  59507/73      3/75       Australia--.
```

Signed and Sealed this

Thirtieth Day of June, 1998

Attest:

BRUCE LEHMAN

Attesting Officer

Commissioner of Patents and Trademarks